United States Patent [19]
Mare et al.

[11] 3,850,777
[45] Nov. 26, 1974

[54] CONTAINER BANDING APPARATUS

[75] Inventors: Peter D. Mare, Upper Saddle River, N.J.; Albert L. Ross, Dix Hills, N.Y.

[73] Assignee: Flip-On Packaging Inc., Long Island City, N.Y.

[22] Filed: Sept. 27, 1972

[21] Appl. No.: 292,692

[52] U.S. Cl.............. 156/494, 29/235, 53/198 R, 156/229, 156/565, 156/566
[51] Int. Cl.............................................. B32b 1/08
[58] Field of Search .......... 156/229, 494, 566, 483, 156/484, 485, 521; 53/198 R, 3, 292, 291; 29/235

[56] References Cited
UNITED STATES PATENTS

| | | | |
|---|---|---|---|
| 2,843,984 | 7/1958 | Dunning | 53/261 X |
| 3,523,052 | 8/1970 | Bolen | 156/86 X |
| 3,551,258 | 12/1970 | Galvanoni et al. | 156/494 X |

*Primary Examiner*—Edward G. Whitby
*Attorney, Agent, or Firm*—Burgess, Dinklage & Sprung

[57] ABSTRACT

Apparatus for banding containers is disclosed and includes a band applying and container positioning device which is adapted to receive thereover an opened or semi-opened container band, means for inserting containers to be banded upwards into the applying and positioning device with a container band thereover and means for removing banded containers from the applying and positioning device. Further means can be provided for dispensing individual container bands such as plastic band labels or neck bands onto the applying and positioning device in an opened or semi-opened state.

A process is also disclosed for banding containers and includes the steps of dispensing individual band members in an opened or semi-opened state onto a container positioning and band applying station, inserting containers to be banded upwards into the station and removing banded containers from the station.

2 Claims, 2 Drawing Figures

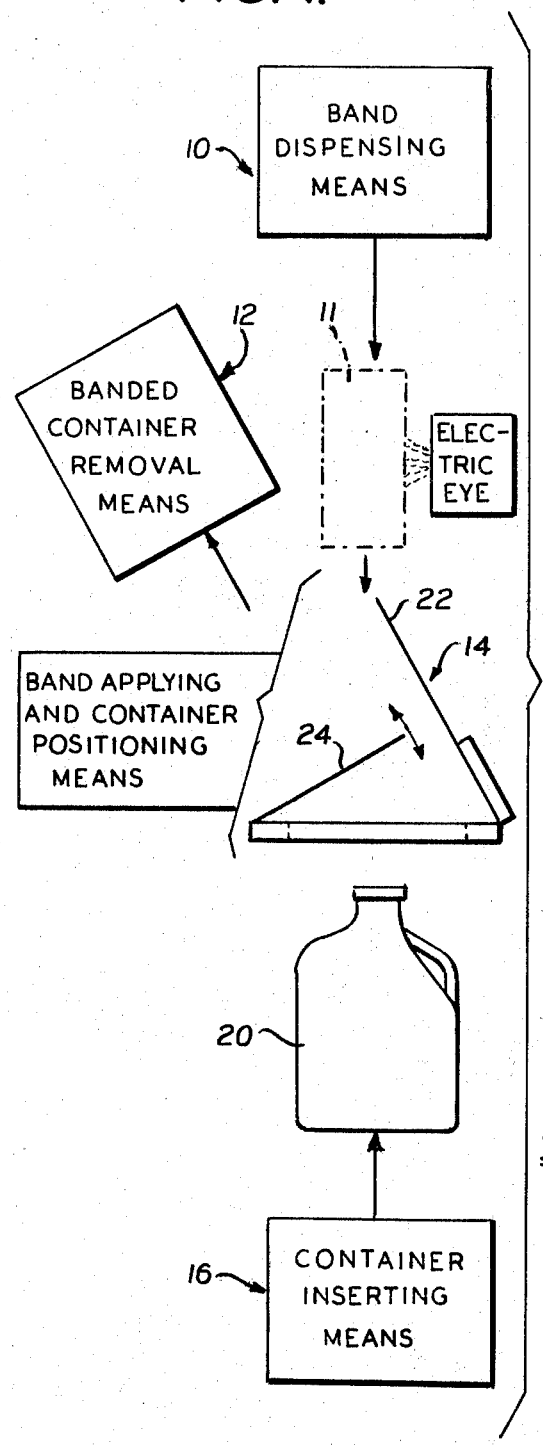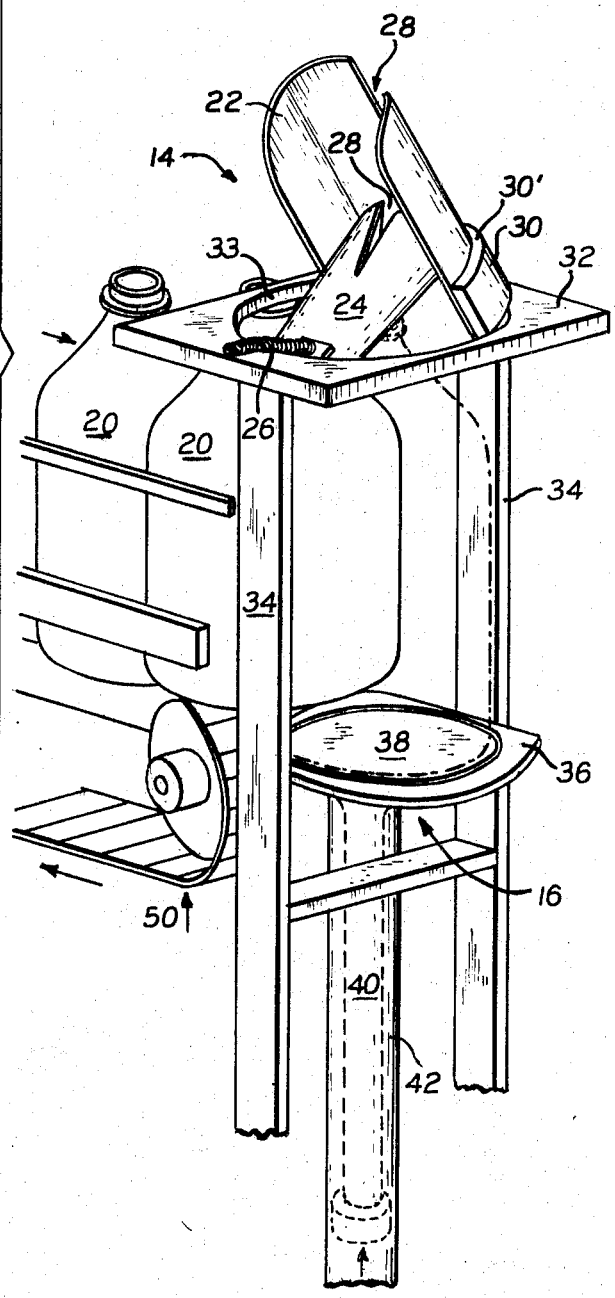

CONTAINER BANDING APPARATUS

RELATED APPLICATIONS

This application is related to co-pending application Ser. No. 147,029, filed May 26, 1971, now U.S. Pat. No. 3,811,986 for Band Label Applying and Container Positioning Apparatus, which application is a continuation-in-part of application Ser. No. 105,840, filed Jan. 12, 1971, now abandoned.

This application is also related to co-pending application Ser. No. 274,929, filed July 25, 1972, now U.S. Pat. No. 3,792,807 issued Feb. 19, 1974 for Band Dispensing Apparatus, which is a continuation-in-part of co-pending application Ser. No. 245,858, filed Apr. 20, 1972.

BACKGROUND

Blow-molded plastic bottles are currently widely used for packaging various kinds of liquid and powder products for consumer and industrial use. Such products include chemicals, laundry products and antifreeze, just to mention a few.

Pre-labeling blow molded bottles using a silk screen technique has been generally limited to one color due to the cost involved. Besides being expensive, this technique makes it necessary to maintain an inventory of pre-labeled bottles. Pre-printed plastic band labels have been used to obviate pre-labeling and storage problems and have met with considerable success. Our co-pending application, Ser. No. 147,029 mentioned above, describes the advantages of using pre-printed plastic band labels and discloses a device for positioning a container and applying a band label thereto by hand. Our co-pending application Ser. No. 274,929 mentioned above discloses apparatus for increasing the efficiency of the band labeling operation utilizing the device of application Ser. No. 147,029 by providing apparatus for automatically dispensing individual labels in an opened or semi-opened condition onto said device.

The combination of the label dispensing device and the container positioning and label applying device has met with commercial acceptance but has given rise to the need for a completely automatic or semi-automatic operation for inserting containers to be banded and for removing banded containers which, up to this time, has been done by hand.

The present invention therefore relates to a process and apparatus for banding containers fully automatically, or semi-automatically if desired. More particularly, the present invention relates to a process and apparatus for applying band labels to containers utilizing the in-plant, in-line, economical and effecient system requiring a minimum of maintenance and operator-time.

SUMMARY

The apparatus of the invention for banding containers comprises a. band applying and container positioning means adapted to receive thereover an opened container band;
b. means for inserting containers to be banded upwards into said applying and positioning means with a container band thereover; and
c. means for removing banded containers from the applying and positioning means.

In a further embodiment, meanns are provided for dispensing individual container bands onto the applying and positioning means in an opened state.

The process of the invention for automatically banding containers includes the steps of a. dispensing individual container bands in an opened state onto a container positioning and band applying station;
b. inserting containers to be banded upwards into the station; and
c. removing banded containers from the station.

DESCRIPTION OF THE DRAWING

FIG. 1 is a schematic diagram of the process and apparatus of the invention for automatically banding containers; and FIG. 2 is a perspective view in elevation of a preferred band applying and container positioning device in combination with a device for inserting containers to be banded upwards thereinto.

DESCRIPTION

In the aforementioned co-pending application, Ser. No. 274,929, the apparatus disclosed for individually dispensing tubular band members, such as plastic band labels from a continuous supply of bands severably attached to one another in strip form includes:

1. a first pair of pressure contact roll means;
2. a second pair of pressure contact roll means below said first pair of roll means;
3. means to drive said first pair of roll means at a predetermined dispensing speed;
4. means to drive said second pair of roll means at a speed greater than said dispensing speed;
5. band separator means suspended in the nip of said first pair of roll means and extending downward between said first and second pairs of roll means and terminating in spreader means suspended below said second pair of roll means;
6. said strip of tubular bands being adapted to be passed between said first and second pairs of roll means and over said separator means and to be individually severed from said strip between said pairs of roll means and individually dispensed downward between said pair of roll means and over said spreader means in a substantially opened condition.

In a preferred embodiment, the separator means of the above described apparatus is suspended between the first pair of roll means by bar means adapted to ride freely in the nip of the first pair of roll means. The bar means has at least one downwardly extending rod means, preferably two or three rod means, passing between both pairs of roll means and attached to the spreader means. Each of the pairs of roll means have vertical grooves to permit the rod means to pass therebetween without interfering with the rolling action of the roll means.

In a further alternate embodiment, the first pair of roll means are adapted to be intermittently driven and the means to drive the first pair of roll means are adapted to drive same in a predetermined cycle. The preferred intermittent drive means disclosed is a Geneva gear means.

Referring now to the accompanying drawing and in particular to the schematic diagram of FIG. 1, the apparatus of the invention for banding containers is shown to include, in a preferred embodiment, band applying and container positioning means 14 which is adapted to receive thereover an opened container band is described in greater detail below. Positioned above the means 14 are band dispensing means 10 for individually dispensing container bands onto the means 14 in an opened state. Positioned below the means 14 are means 16 for inserting containers 20 upwards into the means 14. Associated with the means 14 are means 12 for removing banded containers from the means 14.

The preferred dispensing means 10 is the band dispensing apparatus disclosed in co-pending application Ser. No. 274,929, said apparatus having been described above in detail. Other suitable means for dispensing container bands in an opened or semi-opened position onto the means 14 can also be used. For example, the container bands can be opened and positioned on the means 14 by hand or by using semi-automatic or completely automatic means such as described above in connection with co-pending application Ser. No. 274,929.

Other suitable means 10 for dispensing individual container bands include devices employing knife blade and suction means to sever and open an individual container band from a continuous tube. The opened severed band can then be dropped onto the means 14, or placed thereon, using suitable mechanical arms and guides, etc. One such apparatus is disclosed in Carter U.S. Pat. No. 2,787,104 issued Apr. 21, 1957.

Another suitable band dispensing means 10 is illustrated in Bolen U.S. Pat. No. 3,523,052, issued Aug. 4, 1970. This type of device dispenses individual container bands from a supply roll using a combination of a cone shaped mandrel and a pair of cutting/suction arms to sever the individual bands and dispense them downwards in a substantially opened state.

Preferred means for the means 14 and 16 are shown in greater detail in FIG. 2. The band applying and container positioning means 14 is shown to include an arcuate member 22 and a tongue member 24 which is urged by means of spring means 26 to the position shown in FIG. 2 prior to inserting a container 20 upwards into the means 14.

The members 22 and 24 are mounted on a suitable base 32 at the periphery of the central opening 32, it being understood that the relative dimensions of base 32, the opening 33 and the members 22 and 24 are chosen to accommodate the size of the container being banded.

The base 32 with members 22 and 24 mounted thereon is positioned in the desired location by means of upright members 34.

Positioned at the lower exterior portion of the arcuate member 22 is an arcuate stop member 30 having an upper surface 30' against which an opened container band dispensed from the means 10 and dropped onto the means 14 will rest. Again, the height, position and relative dimensions of the member 30 will be controlled by the size of the container and the nature of the banding operation, e.g., the application of a tubular band label applied to the body of the container.

The container inserting means is shown to include a horizontal platform 38 which receives containers 20 one at a time from suitable conveyor or advancing means, such as the conveyor 50 illustrated in FIG. 2. The platform 38 is seated in fixed member 36 which is conveniently mounted between the upright members 34. Platform 38 is raised to insert containers into the means 14 by force applied to shaft 40 which rides in tubular member 42. The shaft 40 and platform 38 can be caused to advance up and down to perform the container inserting operation using mechanical means such as a screw or lever or pneumatic or hydraulic means. The platform can be moved up and down by an operator, for example using a foot operated lever, or can be initiated by an operator when a container band is in position on the means 14 and a container 20 is in position on the platform 38 to be inserted upwards into the means 14. Thus, an operator can throw or turn a suitable switch which will activate the means for raising the platform 38 to insert a container 20 into the means 14 having a container band thereover resting against stop 30.

To provide for completely automatic operation in a preferred embodiment, means can be provided such as an electric eye, as shown diagrammatically in FIG. 1, to detect or sense when an individual container band has been dropped onto the means 14 which can then trigger operation of the container inserting means 16.

In order to facilitate transfer of a container band from the means 14 to a container 20, it may be desirable to apply one or more strips or spots of adhesive to the container 20 prior to their being inserted into the means 14 by the means 16. To prevent the fouling of the means 14, suitable cutouts, such as the V-cuts 28 in members 22 and 24, can be provided. to their being inserted into the means 14 by the means 16. To prevent the fouling of the means 14, suitable cutouts, such as the V-cuts 28 in members 22 and 24, can be provided.

The arcuate member 22 and the spring loaded tongue member 24 of the means 14 are adapted to receive an opened container band from the dispensing means 10 and the movement of a container 20 upwards into the means 14 by operation of the inserting means 16 forces the tongue member 24 outward and fully opens and preferably slightly stretches or tensions the container band which is then adapted to slide upwards from the arcuate and tongue members 22, 24 onto the container 20 upon removal of the container from the means 16 by removal means 12, thereby providing a banded container 20.

The removal means 12 can be a hand operation, or mechanical means, such as a mechanical arm or arms, can reach down, grasp the container positioned in the means 14 at a suitable location, e.g., the neck or the container handle, and remove the container 20 from the means 14 while, at the same time, transferring the container band to the container banding same. The mechanical arm or arms can then swing or otherwise move or transfer the banded container to a conveyor or other such means for subsequent filling and/or packaging.

In another embodiment, the means 14 can be a substantially vertical alignment with the dispensing means 10 and the inserting means 16. For example, the arcuate member 22 would be vertically positioned to receive an opened container band from the dispensing means 10. The banded container removal means 12 in this embodiment would then be adapted to operate between the dispensing means 10 and the applying means 14. For example, the platform 38 and the shaft 40 of the means 16 can be adapted to perform a second upward stroke to push the banded container 20 upwards to clear the means 14, at which point suitable mechanical means, such as a sweep arm or the like, can be employed to transfer the banded container from the platform 38 to a conveyor or similar such device.

Mechanical means can also be provided to assist in transferring a container band from the means 14 to a container 20 during the removal operation, for example, a pair of arms can hold a container band against the sides of a container 20 in the space between members 22 and 24 which is provided when a container 20 is inserted upwards into the means 14. These mechanical pressure arms would then be adapted to travel with the removal means 12 untill the banded container is clear of the means 14.

In operation containers are banded by individually advancing containers 20 by means of conveyor 50 onto platform 38 of the means 16. A container in position on the platform is shown in phantom in FIG. 2. At the same time or prior to positioning a container 20 in the inserting means 16, the band dispensing means 10 dispenses a container band onto the means 14. This is shown diagrammatically in FIG. 1 wherein an opened filling label 11 is shown in phantom passing the preferred embodiment of the detecting or sensing means such as an electric eye.

When the label 11 is in place over the means 14 and the container is in position under the means 14, the means 16 inserts the container upwards into the means 14 which causes the tongue member to move outward to accommodate the container therein with the prepositioned container band 11 surrounds arcuate member 22, tongue member 24 and the container 20. The upward stroke of the inserting means 16 is adjusted to position the container 20 in the means 14 at the location desired for the container band 11. In the embodiment shown in FIG. 2, the angle of the fixed arcuate member 22 causes the container to assume the same angled position when inserted into the means 14. This facilitates removal of the banded container without interfering with the band dispensing means 10, but is pointed out previously the arcuate member 22 can be disposed vertically with respect to the dispensing means 10 and the inserting means 16 and the removal means 12 is adapted to operate intermittently in the space between the means 10 and 14.

The outward movement of the tongue member 24 as the container 20 is inserted into the means 14 causes the container band prepositioned on the means 14 to become fully banded and conform to the configuration of the container 20. It is preferred that the container band be dimensioned such that it is slightly stretched or tensioned as the container 20 is inserted into the means 14 by the outward movement of the tongue 24 and the upward movement of the container itself. If desired containers to be banded can be provided with an annular intended portion which is adapted to receive the container band to ensure proper positioning and a tension fit.

The members 22 and 24 are generally constructed of thin sheet steel with smooth outer surfaces. Thus, upon operation of the removal means 12 the container 20 is withdrawn upwards or out of the means 14 and at the same time the container band slides off of or from the means 14 and embraces or incompasses the container 20 in the desired position as the banded container clears the means 14.

As described above, the banded container removal means 12 can be adapted to transfer the banded container to a conveyor or similar means for forwarding to a subsequent filling and/or packaging station. The invention can be utilized to band a wide variety of containers which can vary in size and shape for example, blow molded plastic bottles can be banded as well as round or angular metal containers.

What is claimed is:

1. Apparatus for banding containers comprising:
   a. band applying and container positioning means adapted to receive thereover an opened container band;
   b. means for inserting containers to be banded upwards into said applying and positioning means with a container band thereover;
   c. means for removing banded containers from said applying and positioning means; and
   d. said applying and positioning means including an arcuate member and a spring loaded tongue member adapted to receive an opened or semi-opened band thereover and a container to be banded upwards thereinto, the movement of said container upwards fully opening and/or stretching the band thereon which is adapted to slide from the arcuate and tongue members onto the container upon removal of the container therefrom, thereby banding same.

2. Apparatus of claim 1 which includes means for dispensing individual container bands onto said applying and positioning means in an opened state.

* * * * *